Figure 1:
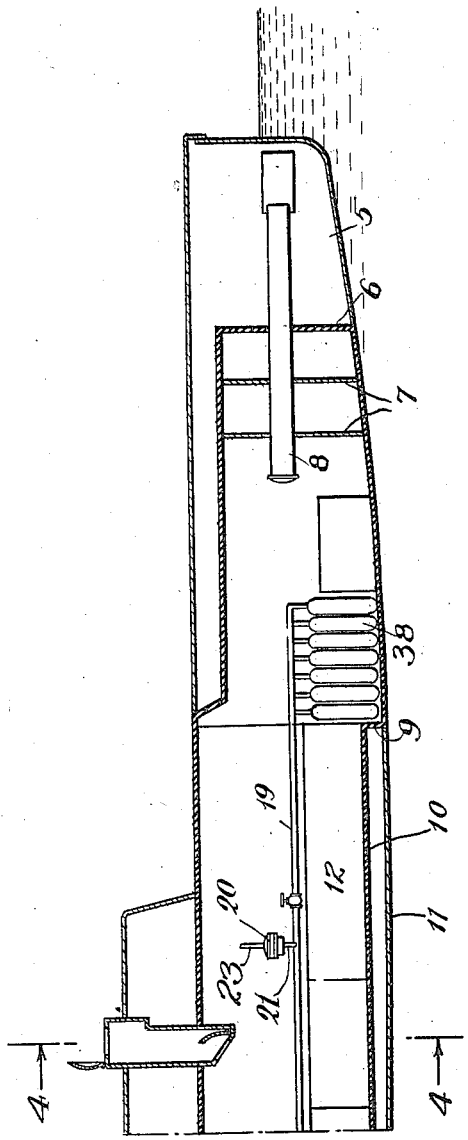

H. E. GRIESHABER.
SUBMARINE BOAT.
APPLICATION FILED JUNE 2, 1915.

1,170,529.

Patented Feb. 8, 1916.
2 SHEETS—SHEET 1.

INVENTOR,
Hugo E. Grieshaber,
BY
ATTORNEYS

H. E. GRIESHABER.
SUBMARINE BOAT.
APPLICATION FILED JUNE 2, 1915.
1,170,529.
Patented Feb. 8, 1916.
2 SHEETS—SHEET 2.
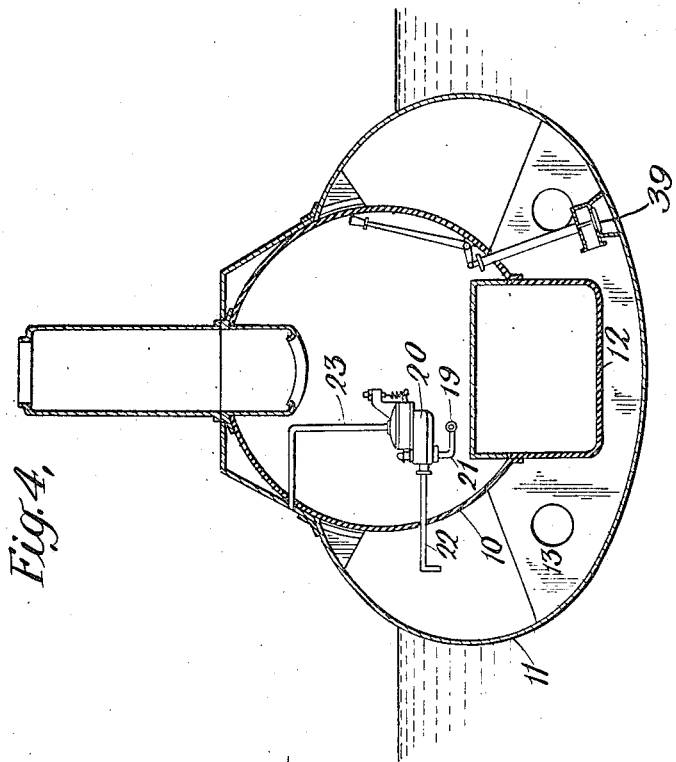
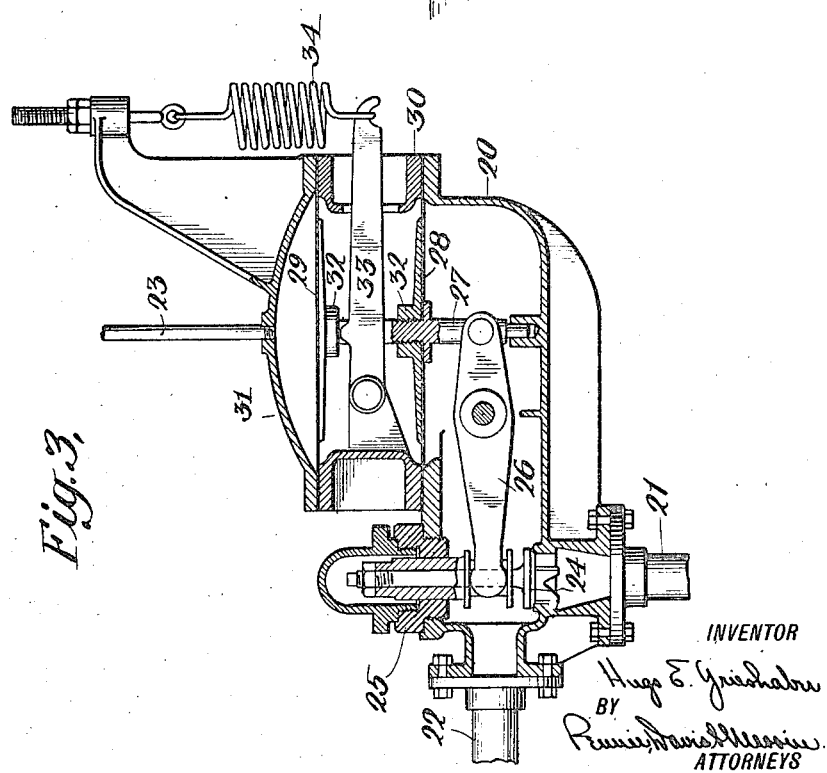
INVENTOR
Hugo E. Grieshaber
BY
ATTORNEYS

UNITED STATES PATENT OFFICE.

HUGO E. GRIESHABER, OF NEW LONDON, CONNECTICUT, ASSIGNOR TO ELECTRIC BOAT COMPANY, OF NEW YORK, N. Y., A CORPORATION OF NEW JERSEY.

SUBMARINE BOAT.

1,170,529.  Specification of Letters Patent.  Patented Feb. 8, 1916.

Application filed June 2, 1915. Serial No. 31,652.

*To all whom it may concern:*

Be it known that I, HUGO E. GRIESHABER, a citizen of the United States, residing at New London, in the county of New London and State of Connecticut, have invented certain new and useful Improvements in Submarine Boats; and I do hereby declare the following to be a full, clear, and exact description of the invention, such as will enable others skilled in the art to which it appertains to make and use the same.

A submarine boat is ordinarily provided with a certain number of main ballast tanks of such volume that when full they destroy the major portion of the buoyancy of the boat. In order to avoid the shifting of ballast, these main ballast tanks are invariably completely filled with water and are usually open to the sea when the boat is submerged, and consequently the internal and external pressure of the outer or sea walls of these tanks is substantially equalized at all times. Advantage has been taken of this fact to reduce the total weight of the hull by constructing the outer skin or sea wall of these tanks of relatively light plating, and in this way important advantages in the construction of such vessels have been attained. The use of such tanks gives rise, however, to the danger that the pressure of the compressed air used to expel the water from the main ballast tanks when the tanks are to be emptied, may so far exceed the external pressure as to overstrain or even disrupt the relatively weak plating.

The object of the present invention is to obviate this disadvantage and obtain the full utility of the desirable construction. To this end, it involves the provision of air pressure regulating means controlling the flow of air to such tanks and so constructed and arranged as automatically to prevent the air admitted to the tanks from rising to a pressure which exceeds the external pressure by more than a predetermined amount which is insufficient to unduly strain the outer walls of the tanks.

In the present instance, the invention is disclosed as applied to a double hull construction of approved design. An air pressure regulator is provided in the conduit by which the air passes to the main ballast tanks, and this regulator includes automatically actuated means for regulating the pressure of the air with reference to the pressure of the water surrounding the boat. In this way, the pressure of the air admitted to the ballast tanks may be readily held at a definite amount in excess of the pressure of the surrounding water, whatever the depth of submergence may be.

Figure 2:
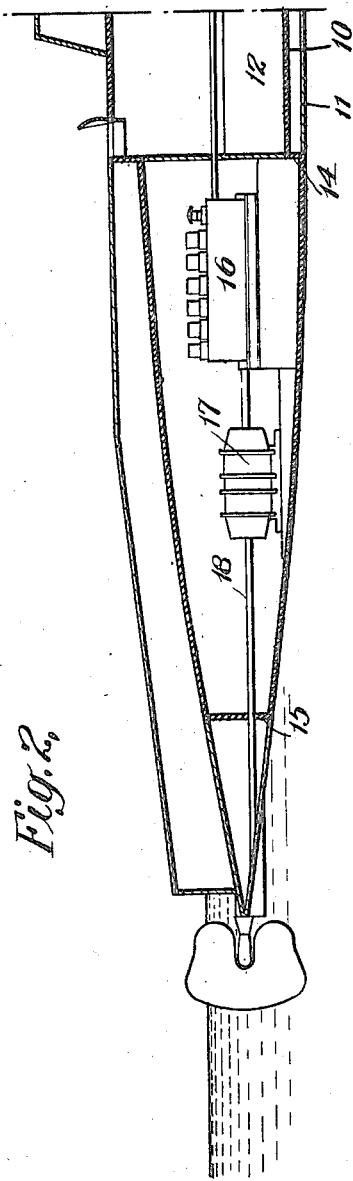

In the drawings, Figures 1 and 2 together constitute a central vertical section of a submarine boat; Fig. 3 is a central vertical section of the regulator; and Fig. 4 is a transverse section of the boat on line 4—4 of Fig. 1.

Referring to these drawings, Figs. 1, 2 and 4 show a submarine boat of the type employing a double hull construction, that is, the type in which a section of the boat consists of a relatively strong inner hull and surrounding this a relatively weak outer hull, the space between the two hulls being utilized wholly or in part for the main ballast tanks.

Preferably, the double hull construction embraces only the central section of the boat and forward and aft of this section are sections of single hull construction. The portions of the boat at the extreme bow and stern are not of a shape which permits of making them readily of the strength required to withstand the pressure of deep submergence, so that these extreme ends of the boat are preferably of a light construction and are arranged to be completely filled with water when the boat is submerged; that is to say, these portions of the boat are likewise used as parts of the main ballast tank system. The bow section of the boat is shown at 5, this section being of relatively weak construction and adapted to be filled with water when the boat is submerged. At the rear end of this section is a bulkhead 6 which is at the forward end of the section of the hull which is of strong construction. Within this section, bulkheads 7 may be provided to form the necessary tanks and to add strength, and if desired, a torpedo tube or tubes 8 may extend through these bulkheads to the bow of the boat. Also, within this section of strong hull construction, provision may be made for the air flask 38. This forward section of strong hull construction terminates at the bulkhead 9. From this point back the double hull construction is employed consisting of an inner hull 10 of relatively heavy plating and an outer hull 11 of lighter plating. The inner hull 10 is preferably of cylindrical form, as shown in Fig. 4, except that it is interrupted along the lower side thereof to receive a box-like rectangular structure 12 which forms part of the pressure-resisting hull and accommodates the storage battery equipment as well a certain of the tanks which are located within the strong hull. In order to stiffen the structure, a plurality of cradle-plates 13 are provided mounted transversely between the inner and outer hulls 10 and 11 and secured thereto. The central section of double hull construction terminates at the bulkhead 14 and aft from this point the single strong hull construction is continued back to the bulkhead 15. Within this section of single hull construction are propelling engines 16 and the electric motors 17 connected to the propeller shafts 18. At the extreme stern of the boat is a relatively short section of light construction not adapted to withstand the pressure of deep submergence. The propeller shafts extend through this compartment and the latter may be employed for the storage of fuel or may be arranged to be filled with water when the boat is submerged.

The space between the inner and outer hulls of the central section of the boat is employed for one or more main ballast tanks and when the boat is to be submerged, water is admitted to this space so as to fill it. When these tanks are to be emptied, air under pressure is admitted to this inter-hull space so as to expel the water therefrom. This air is drawn from the air supply tanks 38 and passes therefrom through the air line of the boat indicated at 19. The flow of air from the air line into the ballast tanks is controlled automatically by a regulator which regulates the pressure of the air admitted to the ballast tanks with reference to the pressure of the water surrounding the boat. This regulator is shown at 20 in Fig. 4 and is illustrated in detail in Fig. 3. In Fig. 4, the air line 19 is shown as connected to the regulator by a pipe 21 and from the regulator a pipe 22 leads to the ballast tanks. The regulator is also connected by a pipe 23 to the exterior of the boat so that the surrounding water may pass into the regulator through this pipe 23.

Referring to Fig. 3, it will be seen that the construction of the regulator provides a passage connecting the pipes 21 and 22 and that this passage is controlled by a valve 24. The stem of this valve is suitably guided in a collar or bushing 25, preferably adapted for removal when desired. The stem of the valve has circumferential flanges thereon between which are received the bifurcated ends of a lever 26 pivoted upon the casing of the regulator and having its opposite end pivotally connected to a rod 27. One end of this rod moves in a bearing formed on the casing and the other end of the rod is connected to two flexible diaphragms 28 and 29 mounted parallel to each other but spaced apart as shown. This spacing of the two diaphragms is provided by a spacer 30 secured at one side to the casing of the regulator. At its other side where the diaphragm 29 is supported, the spacer has a cover-plate 31 secured to it and forming with the diaphragm 29 a chamber to which the pipe 23 is connected so that the water surrounding the boat is admitted to this chamber. Excessive flexure of the diaphragms is prevented by diaphragm plates 32 secured to the rod 27. Within the spacer 30 is a lever 33 pivoted on a suitable standard and held in engagement with the upper diaphragm plate 32 by a spring 34 located outside the regulator and connected at one end to the projecting end of lever 33 and at the other to an adjustable screw. When air is admitted to the pipe 21, it passes to the valve 24 and raises the latter from its seat, thus permitting the air to pass through the regulator and pipe 22 to the ballast tank of the boat. This air passing through the regulator acts upon the diaphragm 28 to cause upward movement thereof and since the diaphragm 28 is connected through rod 27 and lever 26 to the valve 24, this movement of the diaphragm tends to close the valve. At the same time, the pressure of the water surrounding the boat is exerted upon the diaphragm 29 in a direction opposed to the pressure of the air on the diaphragm 28, that is, a direction such that movement of the diaphragm 29 in response to this pressure causes opening movement of the valve 24. Furthermore, the spring 34 acts through lever 33 and rod 27 in a direction to cause closing movement of valve 24. The pressure of the air upon the lower surface of valve 24 and the pressure of the water upon the diaphragm 29 are therefore balanced against the pressure of the air upon the upper surface of valve 24, the pressure of the air upon the diaphragm 28 and the pressure of spring 34. These opposing pressures regulate the position assumed by the valve 24 so as to determine the freedom of flow of air through the regulator and thus control the pressure of the air admitted to the ballast tanks. The spring 34, adjustable as to its tension and located outside the casing of the regulator, provides means for effecting an adjustment of the pressure of the air flowing through the regulator as desired. Also, the provision of two diaphragms spaced apart and having the space between them open to the exterior of the regulator provides a telltale whereby breakage of either of the diaphragms would be immediately indicated.

Any suitable means may be provided for admitting water to the ballast tank. In Fig. 4 a suitable valve-controlled sea connection is shown at 39 operated from within the boat.

It will thus be seen that the construction provides for regulating the pressure of the air admitted to the ballast tanks with reference to the pressure of the surrounding water whatever the pressure of the latter may be at the particular depth to which the boat has been submerged. Therefore, the admission of air to the ballast tanks to expel the water therefrom does not involve danger of subjecting the exterior and relatively weak plating of the double hull structure to a pressure of air in excess of what it is adapted to withstand.

The construction illustrated in the drawings and above described has been selected for the purpose of disclosing the principles involved in the invention, but it is to be understood that the invention is not limited to this construction but may be utilized in many and widely different constructions. For instance, it is sometimes desirable to provide a tank within the outer relatively weak plating of the vessel for the storage of liquid fuel and to so utilize such a tank that it is full of either fuel or water at all times. In case of emergency air would be admitted to this fuel tank to expel all of the liquid therefrom and the admission of air to the tank for this purpose may be regulated in the manner above described so as to protect the outer plating of the vessel from excessive pressure.

No claim is made herein to the specific structure of the regulating device illustrated in Fig. 3 and above described.

What I claim is:

1. A submarine boat having a strong inner hull, a relatively weak outer hull, means for admitting water to the space between the hulls, means for admitting air to the space between the hulls to expel the water therefrom, and means for automatically regulating the pressure of the air admitted to the space between the hulls with reference to the pressure of the water surrounding the boat; substantially as described.

2. A submarine boat having a section thereof of double hull construction providing a space for a ballast tank between the inner and outer hulls, means for admitting water to the ballast tank, means for admitting air to the ballast tank to expel the water therefrom, and automatic regulating devices in the air supply line for precluding the admission of air to the ballast tank at a pressure exceeding the pressure of the water surrounding the boat by more than a predetermined amount; substantially as described.

3. A submarine boat having a section thereof of double hull construction including a strong inner hull and a relatively weak outer hull providing space for a ballast tank between the two hulls, a source of supply of compressed air within the boat, a connection therefrom to the ballast tank, an automatic regulator in said connection, and a connection from the regulator to the exterior of the boat whereby the operation of the regulator will be dependent upon the pressure of the water surrounding the boat; substantially as described.

4. A submarine boat having a section thereof of double hull construction including a strong inner hull and a relatively weak outer hull providing space for a ballast tank between them, a source of supply of compressed air within the boat, a connection from said source to the ballast tank, a pressure regulator in said connection, a pipe extending from the pressure regulator to the exterior of the boat, and controlling devices within the regulator controlling the flow of air to the ballast tank and responsive to the pressure of the air flowing through the regulator and to the pressure of the water admitted to the regulator by said pipe; substantially as described.

5. A submarine boat having a tank with a relatively weak outer skin, means for admitting fluid to said tank, means for admitting air to said tank to expel the fluid therefrom, and means for automatically limiting the air pressure within said tank with reference to the pressure of the water surrounding the boat; substantially as described.

6. A submarine boat having a tank with a relatively weak outer skin, means for admitting fluid to said tank, means for admitting air to said tank to expel the fluid therefrom, and automatic regulating devices in the air supply line for precluding the admission of air to the said tank at a pressure exceeding the pressure of the water surrounding the boat by more than a predetermined amount; substantially as described.

7. A submarine boat having a tank with a relatively weak outer skin, a source of supply of compressed air within the boat, a connection therefrom to the said tank, an automatic regulator in said connection, and a connection from the regulator to the exterior of the boat whereby the operation of the regulator will be dependent upon the pressure of the water surrounding the boat; substantially as described.

8. A submarine boat having a tank with a relatively weak outer skin, a source of supply of compressed air within the boat, a connection from said source to the said tank, a pressure regulator in said connection, a pipe extending from the pressure regulator to the exterior of the boat, and controlling devices within the regulator controlling the flow of air to the said tank responsive to the pressure of the air flowing through the regulator and to the pressure of the water admitted to the regulator by said pipe; substantially as described.

In testimony whereof I affix my signature, in presence of two witnesses.

HUGO E. GRIESHABER.

Witnesses:
F. L. BRAKE,
PAULINE MINER.